United States Patent Office 3,505,342
Patented Apr. 7, 1970

3,505,342
HEXAHYDRONICOTINAMIDES
Norman L. Wendler, Summit, David Taub, Metuchen, and Chan Hwa Kuo, South Plainfield, N.J., assignors to Merck & Co., Inc., Rahway, N.J., a corporation of New Jersey
No Drawing. Original application June 3, 1966, Ser. No. 554,997. Divided and this application June 10, 1968, Ser. No. 753,309
Int. Cl. C07d 29/30
U.S. Cl. 260—294          7 Claims

ABSTRACT OF THE DISCLOSURE

Nicotinamide is produced by acylating 3-cyano-4-amino-1,2,5,6-tetrahydropyridine to produce the 1-acyl or 1,4-diacyl derivatives, reacting these derivatives with concentrated mineral acid to produce 1-acyl-4-ketohexahydronicotinamide, reducing this compound to produce the cis- or trans- form of 1-acyl-4-hydroxyhexahydronicotinamide, acylating this compound to produce the corresponding 4-acyloxy compounds, and dehydrogenating these compounds by treatment with a noble metal. Alternatively, the 4-acyloxy compounds are partially dehydrogenated to 1-acyl-1,4,5,6-tetrahydronicotinamide, 1-acyl-1,2,5,6-tetrahydronicotinamide or 1-acyl-1,2-dihydronicotinamide, which are dehydrated by reaction with a noble metal to produce nicotinamide.

This is a division of Ser. No. 554,997 filed June 3, 1966, now U.S. Patent 3,441,568.

This invention relates to novel processes for the preparation of nicotinamide. More particularly, it is concerned with processes for producing nicotinamide from 4-amino-3-cyano-1,2,5,6-tetrahydropyridine and new pyridine compounds useful as intermediates in these processes.

Methods used for the manufacture of nicotinamide all employ as the starting compound products containing a pyridine ring or a substituted pyridine ring as part of the molecular structure. In most cases the nicotinamide is prepared by the degradation of a more complex compound to nicotinic acid and, subsequently, converting the acid to the amide by known methods.

It is an object of the present invention to provide new processes for producing nicotinamide. It is a further object to provide processes for producing nicotinamide starting with 4-amino-3-cyano-1,2,5,6-tetrahydropyridine. Another object is to provide processes for the preparation of 1-acyl - 4 - ketohexahydronicotinamide, 1-acyl-4-hydroxyhexahydronicotinamide and 1-acyl-4-acyloxyhexahydronicotinamide and methods of converting these compounds to nicotinamide. An additional object is to provide processes for producing 1-acyl-1,2,5,6-tetrahydronicotinamide and 1-acyl-1,2-dihydronicotinamide and procedures for converting these compounds to nicotinamide. Other objects will be apparent from the detailed descriptions of this invention hereinafter provided.

The processes for preparing nicotinamide in accordance with our invention can be depicted structurally as follows:

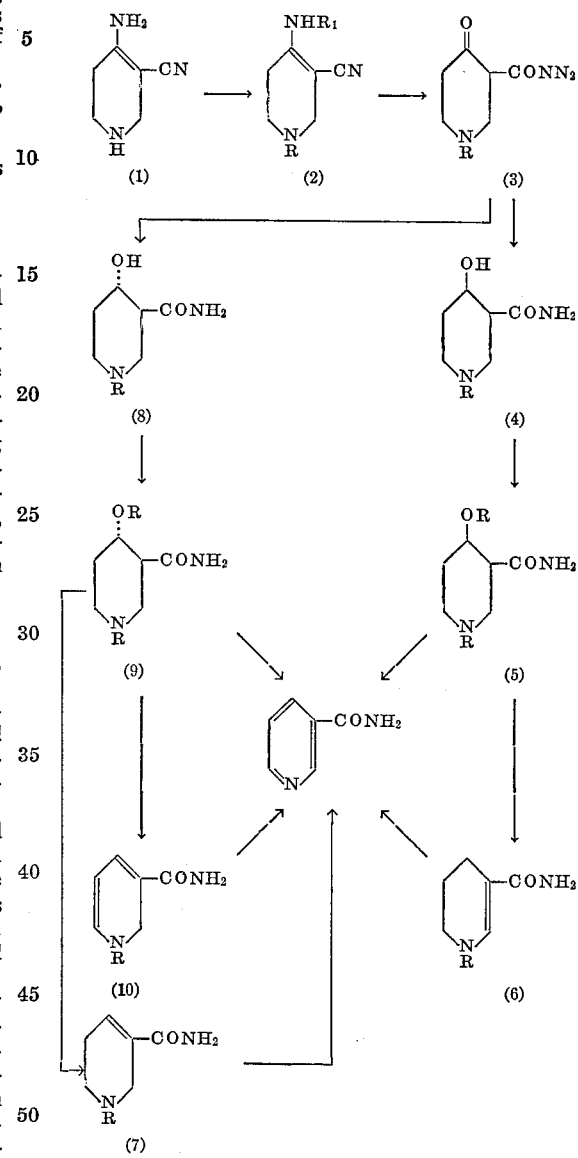

In accordance with one embodiment of this invention, 3-cyano-4-amino-1,2,5,6-tetrahydropyridine (1) is acylated by reaction with an acylating agent to produce either the 1-acyl or 1,4-diacyl derivatives (2) which on treatment with a concentrated mineral acid is converted to the 1-acyl-4-ketohexahydronicotinamide (3). The latter compound is then reduced to produce either the cis or the trans form of 1-acyl-4-hydroxyhexahydronicotinamide (4) and (8); carrying out the reduction with hydrogen in the presence of a hydrogenation catalyst producing the cis form (4), and chemical reduction resulting in the trans form (8). Acylation of the 4-hydroxynicotinamide affords the corresponding 4-acyloxy compounds (5) and (9). These products are then dehydrogenated by treatment with a noble metal to produce nicotinamide. Alternatively, the 4-acyloxy compounds can be partially dehydrogenated to 1 - acyl-1,4,5,6-tetrahydronicotinamide (6), 1-acyl-1,2,5,6-tetrahydronicotinamide (7), or 1-acyl-1,2-dihydronicotinamide (10), which on further dehydrogenation are converted to nicotinamide.

In accordance with the first step of the above-described process, 3 - cyano-4-amino-1,2,5,6-tetrahydropyridine is intimately contacted with an acylating agent with the anhydride or the acid halide of an alkanoic acid having 1–8 carbon atoms to produce the corresponding 1-acyl or 1,4-diacyl derivative depending upon the reaction conditions. The 1-acyl derivative is obtained by intimately contacting the 3-cyano-4-amino-1,2,5,6-tetrahydropyridine at about room temperature with a lower alkanoyl anhydride such as acetic anhydride, or with a lower alkanoyl halide such as acetyl chloride in the presence of an acid binding agent such as pyridine. When the acylation is effected at higher temperatures, for example, by heating with an excess of acetic anhydride, the 1,4-diacyl derivative is obtained.

Pursuant to the second step of our process, the 1-acyl or 1,4-diacyl derivative is intimately contacted with a strong concentrated mineral acid, such as 70% perchloric acid, concentrated hydrochloric acid, syrupy phosphoric acid, or concentrated sulfuric acid to produce the corresponding 1-acyl-4-ketohexahydronicotinamide. Thus, this reaction is most conveniently effected by adding the 1-acyl or the 1,4-diacyl compound with stirring to concentrated sulfuric acid at a temperature between about 0° to 50° C., preferably at about 0° to 20° C., and allowing the resulting reaction mixture to stand for sufficient time to complete the formation of the desired 1 - acyl-4-ketohexhydronicotinamide. The reaction product is readily recovered by diluting the reaction mixture with water, neutralizing it with an alkali such as sodium hydroxide, concentrating the neutralized mixture to dryness, and extracting the dry residue with a suitable solvent for the product such as acetone.

In the next step, the 1-acyl-4-ketohexahydronicotinamide is reduced to the corresponding 4-hydroxy compound. This step can be effected by reacting the 4-keto compound with hydrogen in the presence of a hydrogenation catalyst such as a noble metal or noble metal oxide or by chemical reduction, for example, by treatment with an alkali or alkaline earth metal borohydride. Depending upon the method of reduction, ether the cis or trans isomer of 1-acyl-4-hydroxyhexahydronicotinamide is obtained; the cis form being produced by catalytic reduction, and the trans form by chemical reduction.

The 4-hydroxy compound produced by reduction is then acylated by reaction with an acid anhydride or an acid halide of an alkanoic acid having from 1 to 8 carbon atoms to obtain the corresponding cis or trans 1-acyl-4-acyloxyhexahydronicotinamide.

Finally, the diacylated product is intimately contacted with a noble metal at elevated temperatures to produce nicotinamide. Noble metals such as palladium, platinum, ruthenium, rhodium, osmium, or iridium either in finely-divided form or suspended in a suitable carrier such as carbon can be utilized in effecting this dehydrogenation by heating at a temperature from about 100° C. to about 300° C. for sufficient time to complete the reaction. Thus, the dehydrogenation is effected by heating a mixture of 1-acyl-4-acyloxyhexahydronicotinamide and the noble metal either alone or in the presence of a high-boiling solvent at a temperature of 100° C. to 300° C. for sufficient time to produce nicotinamide. For example, cis-1-acetyl-4-acetoxyhexahydronicotinamide is dehydrogenated by heating with palladium on charcoal at a temperature of 235–240° C. to form nicotinamide which is recovered by sublimation from the heated reaction mixture. Alternatively, the reaction can be carried out by heating the reactants in the presence of a suitable high-boiling solvent such as decalin, stilbene, diphenyl ether and the like; the nicotinamide being recovered from the filtered reaction mixture by extraction with an acidic aqueous solution which is then neutralized with alkali and evaporated to dryness.

In accordance with a further embodiment of our invention, it is found that 1-acyl-4-acyloxyhexahydronicotinamide can be converted to a partially dehydrogenated derivative to produce 1-acyl-1,2,5,6-tetrahydronicotinamide by reaction with an alkali metal tertiary butoxide. For example, when trans-1-acetyl-4-acetoxyhexahydronicotinamide is intimately contacted with potassium teritary butoxide in tertiary butanol solution for 18 hours at 25° C., 1-acetyl-1,2,5,6-tetrahydronicotinamide is produced and can be recovered by concentrating the solution to dryness and extracting the dried residue with acetone. Also, it is found that 1-acyl-1,4,5,6-tetrahydronicotinamide and 1-acyl-1,2-dihydronicotinamide are produced when the cis and trans forms of 1-acyl-4-acyloxyhexahydronicotinamide are converted to a partially dehydrogenated derivative by reaction with a noble metal. The partially saturated nicotinamide compounds can be converted to nicotinamide by further dehydrogenation with a noble metal.

The 1-acyl substituent of the various new compounds described herein can be removed by intimately contacting these compounds with aqueous ammonia at a temperature of about 80° C. in a sealed vessel for about 6 hours. For example, 1-acetyl-4-hydroxyhexahydronicotinamide, 1 - acetyl-1,2,5,6-tetrahydronicotinamide, 1-acetyl-1,4,5,6-tetrahydronicotinamide, 1 - acetyl-1,2-dihydronicotinamide, and 1-acetyl-4-ketohexahydronicotinamide are converted to the corresponding unacetylated compounds in this manner.

The following examples are given to present illustratively the methods of carrying out the processes of the present invention.

EXAMPLE 1

1-acetyl-4-amino-3-cyano-1,2,5,6-tetrahydropyridine

To a stirred slurry of 32.0 grams of 4-amino-3-cyano-1,2,5,6-tetrahydropyridine in 300 ml. of pyridine is added 150 ml. of acetic anhydride while cooling the reaction mixture to maintain the temperature at about 30° C. During a period of about 15–20 minutes, the stirred material dissolved in solution yielding a light yellow solution from which the product begins to precipitate. The reaction is allowed to proceed for an additional 1½ hours and the precipitated product is removed by filtration, washed successively with toluene and ether, and air dried to give substantially pure 1-acetyl-4-amino-3-cyano-1,2,5,6-tetrahydropyridine, M.P. 174–177° C. On recrystallization of the product from acetone, the product exhibits the following characteristics: M.P. 177–178° C.;

$4^{MeOH}_{max}$ 263 m$\mu$, (E 11,600); $\lambda^{Nj}_{max}$ 2.92, 2.99, 3.09 (N—H), $\lambda$.64 (C≡N), 6.06, 6.15$\mu$ The above procedureis repeated using in place of the acetice anhydride reactant the equivalent molar amount of butyric acid anhydride, hexanoic acid anhydride, propionic acid anhydride and valeric acid anhydride. Following the reaction period, the product which results, respectively, is 4-amino-1-butyryl-3-cyano-1,2,5,6-tetrahydropyridine, 4-amino-3-cyano-1-hexanoyl-1,2,5,6-tetrahydropyridine, 4-amino-3-cyano-1-propionyl-1,2,5,6-tetrahydropyridine and 4-amino-3-cyano-1-valeryl-1,2,5,6-tetrahydropyridine which can be isolated as described above.

Similarly, these compounds are produced, respectively, when in place of the corresponding anhydride the acid chloride or bromide is utilized as the acylating agent.

EXAMPLE 2

1-acetyl-4-acetylamino-3-cyano-1,2,5,6-tetrahydropyridine

A solution of 1.0 g. of 4-amino-3-cyano-1,2,5,6-tetrahydropyridine, 10 ml. of pyridine and 5 ml. of acetic anhydride is heated at 100° C. in a nitrogen atmosphere for 16 hours. The entire reaction mixture is concentrated in vacuo and flushed with benzene and ether to afford a brown residue which is crystallized from a mixture of benzene and ether. The crystalline product thus obtained is recrystallized from a mixture of acetone and ether to give an excellent yield of the diactate. M.P. 163–165° C.;

$\lambda_{max.}^{CH_3OH}$ 253 m$\mu$, (E, 11,800); $\lambda_{max.}^{chf.}$ 2.9, 3.0 (NH), 4.52 (C$\equiv$N), 5.81 (Conj. amide), 6.05$\mu$ (amide)

The procedure is repeated and in place of the acetic anhydride reactant there is utilized an equivalent amount of butyric acid anhydride, hexanoic acid anhydride, propionic acid anhydride and valeric acid anhydride, respectively, to produce the corresponding 1-butyryl-4-butyrylamino-3-cyano-1,2,5,6-tetrahydropyridine, 3 - cyano-1-hexanoyl-4-hexanoylamino - 1,2,5,6 - tetrahydropyridine, 3-cyano-1-propionyl-4-propionylamino - 1,2,5,6 - tetrahydropyridine, 3-cyano-1-valeryl - 4 - valerylamino-1,2,5,6-tetrahydropyridine compounds.

EXAMPLE 3

1-acetyl-4-propionylamino-3-cyano-1,2,5,6-tetrahydropyridine

A solution of 1.0 g. of 1-acetylamino-4-amino-3-cyano-1,2,5,6-tetrahydropyridine, 10 ml. of pyridine and 5 ml. of propionic anhydride is heated at 100° C. in a nitrogen atmosphere for 16 hours. The entire reaction mixture is concentrated in vacuo and flushed with benzene and ether to afford a residue consisting essentially of 1-acetyl-4-propionylamino - 3 - cyano-1,2,5,6-tetrahydropyridine.

The above procedure is repeated using in place of the propionic anhydride an equivalent amount of butyric anhydride, hexanoic anhydride and valeric anhydride, respectively, to produce the corresponding 1-acetyl-4-butyrylamino-3-cyano-1,2,5,6-tetrahydropyridine, 1 - acetyl-4 - hexanoylamino-3-cyano-1,2,5,6-tetrahydropyridine and 1-acetyl-4-valerylamino-3-cyano - 1,2,5,6 - tetrahydropyridine.

EXAMPLE 4

1-acetyl-4-ketohexahydronicotinamide 5.1 grams of 1-acetyl-4-amino-3-cyano-1,2,5,6-tetrahydropyridine is added in small portions to a stirred solution of 30 ml. of concentrated sulfuric acid maintained at a temperature of 10–15° C. over a period of about 30 minutes. The clear solution which forms is stirred for an additional 2 hours, following which the entire reaction mixture is added dropwise to 250 ml. of water with vigorous stirring while maintaining the temperature at 0–5° C. The resulting diluted reaction mixture containing the product is adjusted to pH 7 using 11 N aqueous sodium hydroxide solution while maintaining the temperature below 30° C. The entire reaction mixture is then concentrated to dryness under vacuum and the residue containing the product is triturated with four 200 ml. portions of warm acetone. The acetone extract of the product is then concentrated until the crystals appear, then allowed to stand to afford complete crystallization of 1-acetyl-4-ketohexahydronicotinamide. M.P. 155–157° C.;

$\lambda_{max.}^{MeOH}$ 251 m$\mu$, (E, 3,100); $\lambda_{max.}^{MeOH+NaOH}$ 280 m$\mu$, (E, 13,700), 228 m$\mu$, (E, 2,600); $\lambda_{max.}^{Nj}$ 2.95, 2.98, 3.1, 6.0–6.2, 6.37$\mu$; strong purple ferric chloride test In accordance with the above reaction procedures, 4-amino-3-cyano-1,2,5,6-tetrahydropyridine is converted to 4-ketohexahydronicotinamide.

$\lambda_{max.}^{H_2O}$ 270 m$\mu$, $E_{cm.}^{1\%}$ 302; $\lambda_{max.}^{NaOH}$ 278 m$\mu$; $E_{cm.}^{1\%}$ 419; 222 m$\mu$, $E_{cm.}^{1\%}$ 77; $\lambda_{max.}^{KBr}$ 6.10, 6.20$\mu$ When the procedure of the first paragraph of this example is repeated utilizing in place of the 1-acetyl-4-amino-3-cyano-1,2,5,6-tetrahydropyridine an equivalent amount of 4-amino-1-butyryl-3-cyano-1,2,5,6-tetrahydropyridine, 4-amino-3-cyano-1-hexanoyl-1,2,5,6-tetrahydropyridine, 4 - amino-3-cyano-1-propionyl-1,2,5,6-tetrahydropyridine, and 4-amino-3-cyano-1-valeryl-1,2,5,6-tetrahydropyridine, the product produced is the corresponding 1-butyryl-4-ketohexahydronicotinamide, 1 - hexanoyl-4-ketohexahydronicotinamide, 4 - keto-1-propionylhexahydronicotinamide and 4-keto-1-valerylhexahydronicotinamide. Likewise, the corresponding diacyl compound, the preparation of which is described in Examples 2 and 3 hereinabove, when submitted to the same reaction procedures produces the corresponding 1-acyl derivatives of 4-ketohexahydronicotinamide.

EXAMPLE 5

Cis-1-acetyl-4-hydroxyhexahydronicotinamide

A solution of 2.0 grams of 1-acetyl-4-ketohexahydronicotinamide in 35 ml. of methanol is added to a suspension of 500 mg. of platinum oxide, previously reduced) in 20 ml. of methanol in a hydrogen atmosphere at 1 atmosphere pressure. One molar equivalent of hydrogen is absorbed in about 90 minutes. The resulting mixture is filtered to remove the catalyst and the filtrate containing the reduced product is evaporated to dryness in vacuo. The product, cis - 1 - acetyl-4-hydroxyhexahydronicotinamide, obtained is crystallized from acetone. Double M.P. 135–140° C.; 150–155° C.;

$\lambda_{max.}^{Nj}$ 2.95–3.10, 5.95, 6.04, 6.16, 6.25$\mu$

The above procedure is repeated utilizing in place of the 1-acetyl - 4 - ketohexahydronicotinamide an equivalent amount of 1 - butyryl-4-ketohexahydronicotinamide, 1-hexanoyl-4-ketohexahydronicotinamide, 1-propionyl - 4-ketohexahydronicotinamide and 1 - valeryl-4-ketohexahydronicotinamide to produce, respectively, the corresponding cis-1-butyryl-4-hydroxyhexahydronicotinamide, cis-1 - hexanoyl-4-hydroxyhexahydronicotinamide, cis-1-propionyl-4-hydroxyhexahydronicotinamide and cis 1-valeryl-4-hydroxyhexahydronicotinamide.

EXAMPLE 6

Cis-4-acetoxy-1-acetylhexahydronicotinamide

A solution of 1.0 g. of cis-1-acetyl-4-hydroxyhexahydronicotinamide in 5 ml. of pyridine and 2 ml. of acetic anhydride is prepared and allowed to stand for 16 hours. The cis-4-acetoxy-1-acetylhexahydronicotinamide which precipitates on addition of water with stirring at 20° C. is removed by filtration and crystallized from a mixture of acetone and ether. M.P. 154–158° C.;

$\lambda_{max.}^{Nj}$ 2.98, 3.14, 5.79, 5.9, 5.98, 6.2, 8.05$\mu$

The procedure of Example 5 is repeated utilizing as alternative starting materials equivalent amounts of cis-1-butyryl-4-hydroxyhexahydronicotinamide, cis-1-hexanoyl-4 - hydroxyhexahydronicotinamide, cis-1-propionyl-4-hydroxyhexahydronicotinamide, and cis - 1 - valeryl-4-hydroxyhexahydronicotinamide to produce, respectively, the corresponding cis-4-acetoxy-1-butyrylhexahydronicotinamide, cis-4-acetoxy-1-hexanoylhexahydronicotinamide, cis-4-acetoxy-1-propionylhexahydronicotinamide and cis-4-acetoxy-1-valerylhexahydronicotinamide.

EXAMPLE 7

Trans-1-acetyl-4-hydroxyhexahydronicotinamide

To a solution of 1 gram of 1-acetyl-4-ketohexahydronicotinamide in 10 ml. of water is added with stirring a solution of 350 mg. of sodium borohydride in 7 ml. of water containing one drop of 2 N sodium hydroxide. The reduction of the starting material is followed by the measurement of the disappearance of the ultraviolet absorption of the starting material. The reaction is complete in about 2 hours and a solution of aqueous acetic acid (1:1) is added to destroy excess sodium borohydride. The reaction mixture containing the product is then made slightly alkaline with sodium hydroxide and the entire reaction mixture then concentrated to dryness under reduced pressure, yielding the product as a solid residue. The residue is triturated with methanol and the trans-1-acetyl-4-hydroxyhexahydronicotinamide crystallized from the methanol extract and purified by recrystallization. M.P. 190–192° C.;

$\lambda_{max.}^{Nj}$ 2.92–3.12, 5.95, 6.25µ

The above procedure is repeated utilizing in place of the 1-acetyl-4-ketohexahydronicotinamide starting material an equivalent molar amount of 1-butyryl-4-ketohexahydronicotinamide, 1-hexanoyl-4-ketohexahydronicotinamide, 1-propionyl-4-ketohexahydronicotinamide and 1-valeryl-4-ketohexahydronicotinamide to produce the corresponding trans-1-butyryl-4-hydroxyhexahydronicotinamide, trans-1-hexanoyl-4-hydroxyhexahydronicotinamide, trans - 1 - propionyl-4-hydroxyhexahydronicotinamide and trans-1-valeryl-4-hydroxyhexahydronicotinamide.

EXAMPLE 8

Trans-4-acetoxy-1-acetylhexahydronicotinamide

To a solution of 1.0 g. of trans-1-acetyl-4-hydroxyhexahydronicotinamide in 5 ml. of pyridine is added 2 ml. of acetic anhydride and the solution maintained at room temperature for approximately 16 hours. Water is added with stirring maintaining the temperature at 20° C. and the product, trans-4-acetoxy-1-acetylhexahydronicotinamide, precipitates and is recovered by filtration. Recrystallization of the material from acetone gives substantially pure product. M.P. 204–205° C.

The products produced in accordance with the second paragraph of Example 7 hereinabove are acetylated in a similar manner to produce the corresponding 4-acetoxy derivatives thereof.

The above procedure is again repeated utilizing as the starting materials the products obtained in accordance with the second paragraph of Example 7 hereinabove and as reactants in place of acetic anhydride an equivalent amount of butyric anhydride, hexanoic anhydride, propionic anhydride and valeric anhydride to produce the corresponding 4-butyryloxy, 4-hexanoyloxy, 4-propionyloxy and 4-valeryloxy derivatives thereof.

EXAMPLE 9

Nicotinamide

A mixture of 160 mg. of cis-4-acetoxy-1-acetylhexahydronicotinamide and 100 mg. of 30% palladium on charcoal is heated under an atmosphere of nitrogen at one atmosphere pressure at 235–240° C. for approximately 2 hours in a sublimation apparatus. During the heating period crystalline nicotinamide sublimes from the reaction mixture and is recrystallized from a mixture of acetone ether to give crystalline product. M.P. 124–126° C.

The above procedure is repeated utilizing in place of the cis-4-acetoxy-1-acetylhexahydronicotinamide starting material an equivalent amount of each of the products obtained in accordance with Example 6 to produce nicotinamide in good yield.

EXAMPLE 10

Nicotinamide

A mixture of 250 mg. of trans-4-acetoxy-1-acetylhexahydronicotinamide and 200 mg. of 30% palladium on charcoal catalyst in 7 ml. of decalin is refluxed for 18 hours. The entire reaction mixture containing the product is then cooled and diluted with ether and the catalyst removed from the solution by filtration. The filtrate containing the desired product is extracted with 1 N aqueous hydrochloric acid. The acid extract is then made slightly alkaline with a dilute aqueous sodium hydroxide solution and the entire extract concentrated to dryness to obtain a residue. The residue is then triturated with acetone to extract the product from the impurities and the acetone extract concentrated to yield a residue consisting essentially of nicotinamide as estimated by thin layer chromatography and comparison of the ultraviolet spectrum of the product in methanol with that of authentic nicotinamide.

The above procedure is repeated utilizing in place of the trans-4-acetoxy-1-acetylhexahydronicotinamide starting material an equivalent amount of each of the products obtained in accordance with Example 8 to produce nicotinamide in good yield.

EXAMPLE 11

1-acetyl-1,2,5,6-tetrahydronicotinamide

To a stirred suspension of 456 mg. (2.00 millimol) of trans-1-acetyl-4-acetoxyhexahydronicotinamide in 8 ml. of tert-butanol maintained under nitrogen is added 2.00 ml. of 1.09 N potassium tert-butoxide in tert-butanol. After 30 minutes complete solution is achieved. The colorless solution is kept at 25° C. for 18 hours. It is then concentrated to dryness and the residue triturated with acetone. The acetone extract is concentrated to dryness to give a semi-crystalline residue (350 mg.) which is purified by preparative thin layer chromatography on silica gel plates using acetone-2% methanol as the development medium. 1 - acetyl - 1,2,5,6-tetrahydronicotinamide is obtained from the more mobile of the two bands present by trituration with acetone and crystallization from acetone; M.P. 153–155° C.;

$\lambda_{max.}^{H_2O}$ 205 mµ, (E, 19,300): $\lambda_{max.}^{Nj}$ 2.98, 3.17, 6.01, 6.10, 6.25µ

Analysis.—Calcd. for $C_8H_{12}N_2O_2$ (percent): C, 57.13; H, 7.19; N, 16.66. Found (percent): C, 57.15; H, 7.23; N, 16.29.

Reaction of 1-acetyl - 1,2,5,6 - tetrahydronicotinamide with palladium on charcoal as described in Example 9 affords nicotinamide.

In a similar manner, other diacyl derivatives of trans-4-hydroxyhexahydronicotinamide, such as the dipropionyl, dibutyryl, or the dihexanoyl derivatives, are converted by treatment with potassium tert-butoxide to the corresponding 1-acyl derivatives of 1,2,5,6-tetrahydronicotinamide, which on reaction with palladium on charcoal are dehydrogenated to nicotinamide.

EXAMPLE 12

1-acetyl-1,4,5,6-tetrahydronicotinamide

A mixture of 600 mg. of cis-1-acetyl-4-acetoxyhexahydronicotinamide and 450 mg. of 30% palladium on charcoal is kept at 200° C. for 2 hours under nitrogen. The pot residue is recrystallized from acetone to give 1-acetyl-1,4,5,6-tetrahydronicotinamide. M.P. 201–203° C.;

$\lambda_{max.}^{H_2O}$ 274 mµ, (E, 19,800), 210 mµ, (E, 6,050)

Analysis.—Calcd. for $C_8H_{12}N_2O_2$ (percent): C, 57.13; H, 7.19; N, 16.16. Found (percent): C, 57.48; H, 7.02; N, 16.78.

Following the procedure of Example 9, 1 - acetyl-1,4,5,6 - tetrahydronicotinamide is dehydrogenated to nicotinamide.

EXAMPLE 13

1-acetyl-1,2-dihydronicotinamide

A mixture of 500 mg. of trans-1-acetyl-4-acetoxyhexahydronicotinamide and 400 mg. of 30% palladium on charcoal is kept 2 hours at 200° C. under nitrogen in a sublimation apparatus. Acetone is then added to the pot residue, the slurry is filtered, and the filtrate concentrated to dryness. Fractional crystallization of the residue gives 1-acetyl-1,2-dihydronicotinamide. M.P. 175–180° C.;

$\lambda^{H_2O}_{max.}$ 275 m$\mu$, (E, 21,400); $\lambda^{Nj}_{max.}$ 2.81, 3.15, 6.00, 6.15, 6.29$\mu$ By the procedure of Example 9, 1 - acetyl-1,2-dihydronicotinamide is dehydrogenated to nicotinamide.

EXAMPLE 14

Cis-4-hydroxyhexahydronicotinamide

A solution of 1.00 g. of 1-acetyl-cis-4-hydroxyhexahydronicotinamide in 30 ml. of 10% ammonia in ethanol is kept in a sealed vessed at 80° C. for 6 hours. The mixture is cooled and concentrated to dryness under vacuum. The residue is taken up in ethyl acetate and the latter solution washed with saturated aqueous sodium chloride, dried over magnesium sulfate, and concentrated to dryness under vacuum to give cis-4-hydroxyhexahydronicotinamide.

Similar treatment of the corresponding 1-acylates produces trans - 4-hydroxyhexahydronicotinamide, 1,2,5,6-tetrahydronicotinamide, 1,4,5,6 - tetrahydronicotinamide, 1,2-dihydronicotinamide, and 4 - ketohexahydronicotinamide.

The 1-acyl-cis and trans-4-acyloxyhexahydronicotinamides on reaction with ammonia yield the corresponding 4-hydroxyhexahydronicotinamides.

What is claimed is:

1. A compound of the formula

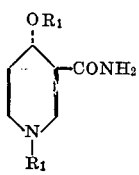

or

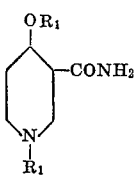

wherein $R_1$ is hydrogen or lower alkanoyl.

2. The compound of claim 1 which is cis-1-acetyl-4-hydroxyhexahydronicotinamide.
3. The compound of claim 1 which is trans-1-acetyl-4-hydroxyhexahydronicotinamide.
4. The compound of claim 1 which is cis-1-acetyl-4-acetoxyhexahydronicotinamide.
5. The compound of claim 1 which is trans-1-acetyl-4-acetoxyhexahydronicotinamide.
6. A compound of the formula

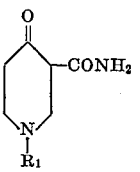

wherein $R_1$ is hydrogen or lower alkanoyl.

7. The compound of claim 6 which is 1-acetyl-4-ketohexahydronicotinamide.

References Cited

Cram et al., Organic Chemistry, 2nd ed., McGraw-Hill Book Co., New York, N.Y. (1964), pp. 351–2, 366, 386, and 415.

Morrison et al., Organic Chemistry, 2nd ed., Allyn and Bacon, Inc., Boston, Mass. (1966), pp. 636, 666, and 669.

Shirley, Organic Chemistry, Holt, Rinehart and Winston, New York, N.Y. (1964), p. 224.

HENRY R. JILES, Primary Examiner

G. T. TODD, Assistant Examiner

U.S. Cl. X.R.

260—294.3